US011868869B1

(12) United States Patent
Huang et al.

(10) Patent No.: US 11,868,869 B1
(45) Date of Patent: Jan. 9, 2024

(54) NON-INTRUSIVE LOAD MONITORING METHOD AND DEVICE BASED ON TEMPORAL ATTENTION MECHANISM

(71) Applicant: ZHEJIANG LAB, Hangzhou (CN)

(72) Inventors: Gang Huang, Hangzhou (CN); Wei Hua, Hangzhou (CN); Yongfu Li, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/215,784

(22) Filed: Jun. 28, 2023

(30) Foreign Application Priority Data

Sep. 15, 2022 (CN) .......................... 202211118482.1

(51) Int. Cl.
G06N 3/04 (2023.01)
G06N 3/049 (2023.01)
(52) U.S. Cl.
CPC .................................... *G06N 3/049* (2013.01)
(58) Field of Classification Search
None
See application file for complete search history.

(56) References Cited

U.S. PATENT DOCUMENTS

2021/0158186 A1* 5/2021 Mimaroglu .............. G01D 4/00

OTHER PUBLICATIONS

Li et al.("A Self-training Multi-task Attention Method for NILM" Aug. 5-7, 2022) (Year: 2022).*
Piccialli et al.("Improving Non-Intrusive Load Disaggregation through an Attention-Based Deep Neural Network" Feb. 2021) (Year: 2021).*
Schirmer et al.("Non-Intrusive Load Monitoring: A Review" Jul. 2022) (Year: 2022).*

* cited by examiner

*Primary Examiner* — Lut Wong
(74) *Attorney, Agent, or Firm* — Jiwen Chen; Joywin IP Law PLLC

(57) ABSTRACT

The present invention relates to the field of smart grids, and provides a non-intrusive load monitoring method and device based on temporal attention mechanism. The method comprises the following steps: obtaining a total load data, an equipment load data, and corresponding sampling time of a building during a certain period of time; integrating the total load data and the equipment load data with the corresponding sampling time to obtain an enhanced total load data and an enhanced equipment load data; using a sliding window method to segment the enhanced total load data and the enhanced equipment load data, and constructing a deep learning training dataset; constructing a neural network model based on a deep learning training framework and training the model using the training dataset. The present invention can effectively extract the working time mode of the load and its inherent dependencies, thereby improving the accuracy of load monitoring.

6 Claims, 2 Drawing Sheets

NON-INTRUSIVE LOAD MONITORING METHOD AND DEVICE BASED ON TEMPORAL ATTENTION MECHANISM This application claims priority of Chinese Application No. 202211118482.1, filed Sep. 15, 2022, which is hereby incorporated by reference.

TECHNICAL FIELD

The present invention relates to the fields of smart grids and artificial intelligence, specifically a non-intrusive load monitoring method and device based on temporal attention mechanism.

DESCRIPTION OF RELATED ART

Conducting efficient demand response is an important task in reducing energy consumption and promoting the construction of next-generation energy systems. At present, non-intrusive load monitoring technology has been applied to identify and decompose the equipment's power consumption load from the total load, and then used for load side energy consumption planning. Considering the difficulty in ensuring the applicability of traditional load monitoring methods based on switch action detection and feature recognition, non-intrusive load monitoring methods based on deep learning technology have been widely used. However, most existing deep learning methods only rely on electrical quantities such as active power and reactive power as the basis for load identification, without considering the dependency relationship between load working time information and different working modes, which limits the accuracy of load monitoring. In other words, how to integrate load operation time information into the load monitoring process to improve the load monitoring effect of equipment with complex working modes is a key issue to further participate in demand response.

SUMMARY OF THE INVENTION

The object of the present invention is to solve the aforementioned technical issues in the work of power loads participation in demand response, and propose a non-intrusive load monitoring method based on temporal attention mechanism.

The technical solution of the present invention is as follows:

A non-intrusive load monitoring method based on temporal attention mechanism, comprising the following steps:

step 1: obtaining a total load data, an equipment load data, and corresponding sampling time of a building during a certain period of time;

step 2: integrating the total load data and the equipment load data with the corresponding sampling time to obtain an enhanced total load data and an enhanced equipment load data;

step 3: using a sliding window method to segment the enhanced total load data and the enhanced equipment load data, and constructing a deep learning training dataset;

step 4: constructing a neural network model based on a deep learning training framework and training the model using the training dataset obtained in step 3.

Furthermore, the step 1 is specially as follows:

obtaining a load power consumption of the building during a certain period of time, sampling time $T=[t_0, t_1, \ldots, t_n]$, and the total load data comprises a total load active power $P_{t_0:t_n}$, a reactive power $Q_{t_0:t_n}$, and an apparent power $S_{t_0:t_n}$, the equipment load data comprises an active power $P_{t_0:t_n}^i$, a reactive power $Q_{t_0:t_n}^i$, and an apparent power $S_{t_0:t_n}^i$ of each equipment during the above sampling time, where i is the equipment number.

Furthermore, the step 2 is specially as follows:

firstly, converting the sampling time $T=[t_0, t_1, \ldots, t_n]$ to the corresponding number of weeks, that is $T_d=[d_0, d_1, \ldots d_n]$, wherein $d_n$ represents the number of weeks the sampling time $t_n$ belongs to;

then, based on the attention mechanism, the total load data and the equipment load data are fused separately with $T_d$, as shown below:

$$\overline{F} = \text{attn}(F, T_d)$$

among them, F can represent the total load active power $P_{t_0:t_n}$, the reactive power $Q_{t_0:t_n}$ and the apparent power $S_{t_0:t_n}$, as well as the equipment load active power $P_{t_0:t_n}^i$, the reactive power $Q_{t_0:t_n}^i$ and the apparent power $S_{t_0:t_n}^i$; $\overline{F}$ represents the load data after fusion and enhancement with time information $T_d$; obtaining the enhanced total load data $\overline{P}_{t_0:t_n}$, $\overline{Q}_{t_0:t_n}$ and $\overline{S}_{t_0:t_n}$, and the enhanced equipment load data $\overline{P}_{t_0:t_n}^i$, $\overline{Q}_{t_0:t_n}^i$ and $\overline{S}_{t_0:t_n}^i$; attn( ) represents the attention mechanism function.

Furthermore, the attention mechanism is implemented using a neural network, i.e., $$\overline{F} = F + \varphi(T_d) \cdot T_d$$

wherein, $\varphi$ represents the neural network and $\cdot$ represents matrix product.

Furthermore, the step 3 is specially as follows:

firstly, using the enhanced total load data and the enhanced equipment load data to construct total load samples $M=[\overline{P}_{t_0:t_n}, \overline{Q}_{t_0:t_n}, \overline{S}_{t_0:t_n}]$, as well as individual load samples $L^i=[\overline{P}_{t_0:t_n}^i, \overline{Q}_{t_0:t_n}^i, \overline{S}_{t_0:t_n}^i]$;

then, using the sliding window with a width of w and a step size of 1 to divide M and $L_i$, and constructing the training data, wherein $$M_{train} = [\{\overline{P}_{tj:tj+w}, \overline{Q}_{tj:tj+w}, \overline{S}_{tj:tj+w}\}|j=0, \ldots, n-w\}$$

$$L_{train}^i \{[\overline{P}_{tj:tj+w}^i, \overline{Q}_{tj:tj+w}^i, \overline{S}_{tj:tj+w}^i]|j=0, \ldots, n-w\}.$$

Furthermore, the step 4 is specially as follows:

In step 4.1, inputting $U^i$ to the following deep learning neural networks:

$$h_0 = U^i$$

$$h_m = \Phi(W_m \cdot h_{m-1} + b_m)$$

wherein, $h_0$ is neural network input, $h_m$, $W_m$ and $b_m$ are respectively the output, weight and bias of the mth hidden layer of the neural network model, and $\Phi(\cdot)$ is the activation function;

In step 4.2, designing the following output layer for learning:

$$F^i = \Psi(W_M \cdot h_M + b_M)$$

wherein, $F^i = [\hat{P}_{tj:tj+w}^i, \hat{Q}_{tj:tj+w}^i, \hat{S}_{tj:tj+w}^i]$ refers to a load forecast of equipment i, $h_M$ refers to the output of the last hidden layer of the network, $W_M$ and $b_M$ refers to the weight and bias of the output layer respectively, $\Psi(\cdot)$ is the activation function;

In step 4.3, the following loss function is designed to train the constructed deep learning neural network model:

$$\text{loss}^i = E(F^i, L_{train}^i)$$

wherein, E is a prediction deviation measurement function.

Furthermore, after the model training is completed, it is applied to load monitoring in other time periods, specifically, the method described in step 2 is used to enhance the active, reactive, and apparent power data of the building for any length of time period w, the trained neural network model is input, and the model output is the equipment's power consumption in the building during this time period.

A non-intrusive load monitoring device based on temporal attention mechanism, comprising one or more processors, for implementing the non-intrusive load monitoring method based on temporal attention mechanism.

A computer readable storage medium on which a program is stored, when the program is executed by a processor, the non-intrusive load monitoring method based on temporal attention mechanism is implemented.

Comparing with the prior art, the present invention has the following advantages:

(1) in the present invention, for the existing load monitoring methods based on deep learning, they only rely on electrical quantities such as voltage, current, and harmonics as the basis for load monitoring, without considering the problem of load working time patterns and their dependencies, an load data enhancement technology based on attention mechanism is adopted innovatively to fuse load operating time information with its electrical quantities, so as to effectively and fully extract the operating modes of different loads as the basis for load monitoring.

(2) in the present invention, by fusing load working time information with its electrical quantities to form model training data, the constructed deep learning neural network can implicitly learn the working time patterns of different loads, indirectly extract their dependencies, and effectively improve the load monitoring effect for devices with complex working modes.

DETAILED DESCRIPTION OF THE INVENTION

The present invention will be described in detail below in conjunction with the accompanying drawings and embodiments. It should be understood that the described embodiments are only a part of the present invention and not all of them. Therefore, the implementation of the present invention should not be limited by the described embodiments, but should be further understood by these embodiments to better serve technical personnel in the field.

Figure 1:
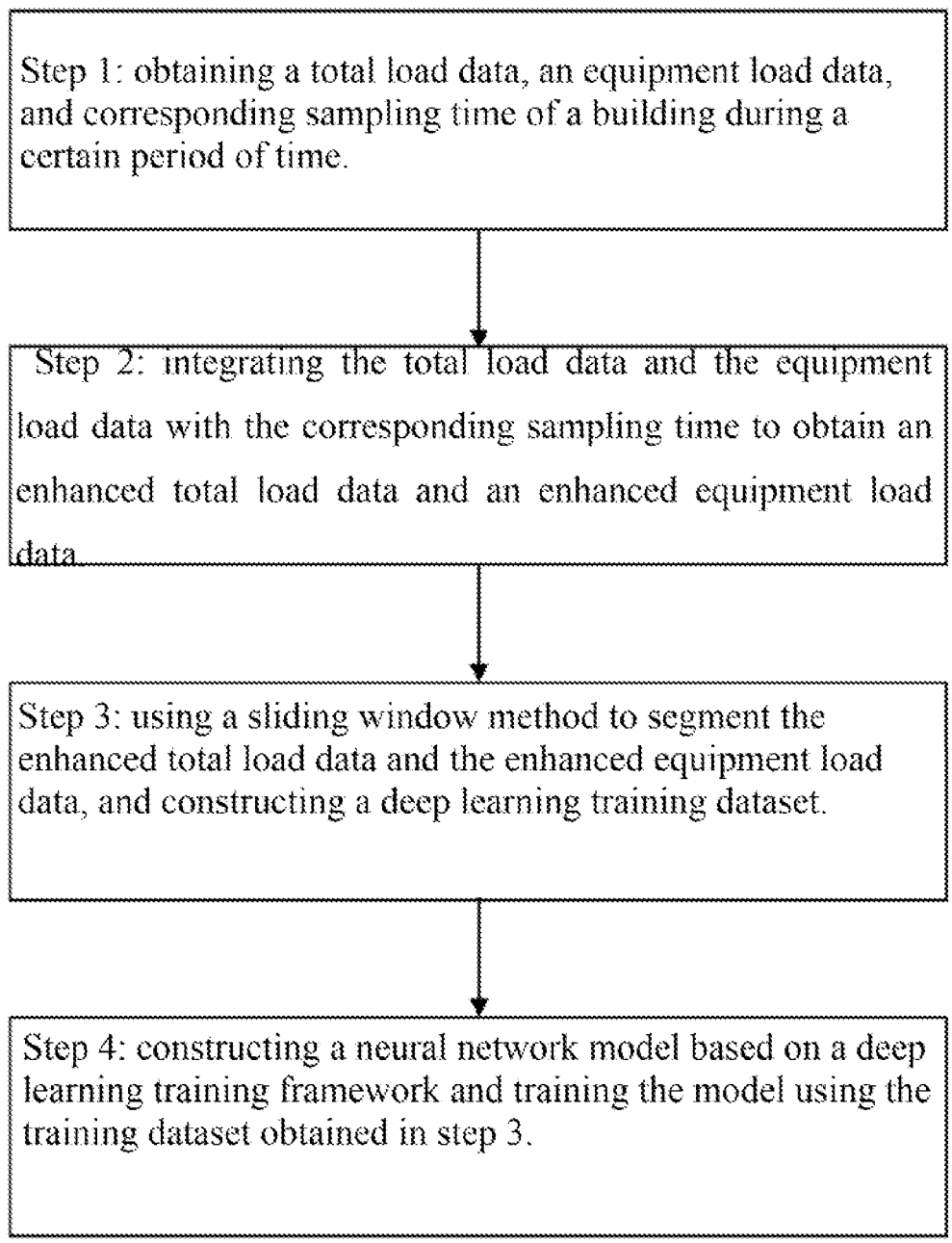
FIG. 1 is a flowchart of a non-intrusive load monitoring method based on temporal attention mechanism of the present invention.

As shown in FIG. 1, the non-intrusive load monitoring method based on temporal attention mechanism of the present invention, comprising the following steps.

Step 1: obtaining a total load data, an equipment load data, and corresponding sampling time of a building during a certain period of time.

Obtaining a load power consumption of a building during a certain period of time, sampling $=[t_0, t_1, \ldots, t_n]$, and the total load data comprises a total active power $P_{t_0:t_n}$, a reactive power $Q_{t_0:t_n}$, and an apparent power $S_{t_0:t_n}$; the equipment load data comprises an active power $P_{t_0:t_n}^i$, a reactive power $Q_{t_0:t_n}^i$, and an apparent power $S_{t_0:t_n}^i$ of each equipment during the above sampling time, where i is the equipment number.

In this embodiment, obtaining a load power consumption of a building in total of 10 equipment, the sampling time is 1 second, namely, $t_0=1$, $t_n=6739200$; the obtained load data comprises the load active power $P_{1:6739200}$, the reactive power $Q_{1:6739200}$, and the apparent power $S_{1:6739200}$, and the active power $P_{1:6739200}^i$, the reactive power $Q_{1:6739200}^i$ and the apparent power $S_{1:6739200}^i$; where the range of the equipment number i is [1,10].

Step 2: integrating the total load data and the equipment load data with the corresponding sampling time to obtain an enhanced total load data and an enhanced equipment load data.

Firstly, converting the sampling time $T=[t_0, t_1, \ldots, t_n]$ to the corresponding number of weeks, that is $T_d=[d_0, d_1, \ldots, d_n]$, wherein, $d_n$ represents the number of weeks the sampling time $t_n$ belongs to.

In this embodiment, the sampling time $t_0$ belongs to Wednesday, $t_n$ belongs to Thursday, then $T_d$ can be represented as: $T_d=[3,3, \ldots, 4]$.

Then, based on the attention mechanism, the total load data and the equipment load data are fused separately with $T_d$, as shown below:

$$\overline{F}=\text{attn}(F,T_d)$$

among them, F can represent the total load active power $P_{t_0:t_n}$, the reactive power $Q_{t_0:t_n}$ and the apparent power $S_{t_0:t_n}$, as well as the equipment load active power $P_{t_0:t_n}^i$, the reactive power $Q_{t_0:t_n}^i$ and the apparent power $S_{t_0:t_n}^i$; $\overline{F}$ represents the load data after fusion and enhancement with time information $T_d$, obtaining the enhanced total load data $\overline{P}_{t_0:t_n}, \overline{Q}_{t_0:t_n}$ and $\overline{S}_{t_0:t_n}$, and the enhanced equipment load data $\overline{P}_{t_0:t_n}^i, \overline{Q}_{t_0:t_n}^i$ and $\overline{S}_{t_0:t_n}^i$; attn( ) represents the attention mechanism function.

In this embodiment, the attention mechanism is realized by a single-layer neural network based on ReLU activation function, namely $$\overline{F}=F+\text{ReLU}(W_d \cdot T_d+b_d) \cdot T_d$$

wherein, $W_d$ and $b_d$ represent the weight and bias of the single-layer neural network, and·represent the matrix product. The enhanced total load data $\overline{P}_{t_0:t_n}, \overline{Q}_{t_0:t_n}$, and $\overline{S}_{t_0:t_n}$, and the enhanced equipment load data $\overline{P}_{t_0:t_n}^i, \overline{Q}_{t_0:t_n}^i$, and $\overline{S}_{t_0:t_n}^i$ can be obtained.

In this embodiment, obtaining the enhanced total load data $\overline{P}_{1:6739200}, \overline{Q}_{1:6739200}$, and $\overline{S}_{1:6739200}$, and obtaining the enhanced equipment load data $\overline{P}_{1:6739200}^i, \overline{Q}_{1:6739200}^i$, and $\overline{S}_{1:6739200}^i$.

Step 3: using a sliding window method to segment the enhanced total load data and the enhanced equipment load data, and constructing a deep learning training dataset.

Firstly, using the enhanced total load data and the enhanced equipment load data to construct total load samples $M=[\overline{P}_{t_0:t_n}, \overline{Q}_{t_0:t_n}, \overline{S}_{t_0:t_n}]$, as well as individual load samples $L^i=[\overline{P}_{t_0:t_n}^i, \overline{Q}_{t_0:t_n}^i, \overline{S}_{t_0:t_n}^i]$.

In this embodiment, the total load samples and individual load samples can be represented as $$M=[\overline{P}_{1:6739200}, \overline{Q}_{1:6739200}, \overline{S}_{1:6739200}]$$

$$L^i=[\overline{P}_{1:6739200}, \overline{Q}_{1:6739200}, \overline{S}_{1:6739200}]$$

Then, using the sliding window with a width of w and a step size of 1 to divide M and $L_i$, and constructing the training data, wherein $$M_{train}=[\{\overline{P}_{t_j:t_{j+w}}, \overline{Q}_{t_j:t_{j+w}}, \overline{S}_{t_j:t_{j+w}}\}|j=0,\ldots,n-w\}$$

$$L_{train}{}^i=[\{\overline{P}_{t_j:t_{j+w}}{}^i, \overline{Q}_{t_j:t_{j+w}}{}^i, \overline{S}_{t_j:t_{j+w}}{}^i\}|j=0,\ldots,n-w\}.$$

In this embodiment, the width w of the sliding window is 599, the step size is 1, then the constructed training data $U^i$ can be further represented as:

$$M_{train}=\{[P_{t_j:t_{j+599}}, Q_{t_j:t_{j+599}}]|j=0,\ldots,6738601\}$$

$$L_{train}{}^i=\{[P_{t_j:t_{j+599}}{}^i, Q_{t_j:t_{j+599}}{}^i]|j=0,\ldots,6738601\}$$

Step 4: constructing a neural network model based on a deep learning training framework and training the model using the training dataset obtained in Step 3.

In step 4.1, inputting $U^i$ to the following deep learning neural networks:

$$h_0=U^i$$

$$h_m=\Phi(W_m \cdot h_{m-1}+b_m)$$

wherein, $h_0$ is neural network input, $h_m$, $W_m$ and $b_m$ are respectively the output, weight and bias of the mth hidden layer of the neural network model, and $\Phi(\cdot)$ is the activation function.

In this embodiment, the hidden layers of the deep learning neural network are all CNN structures, with a total of 5 layers, the number of neurons is 900, 720, 640, 750 and 750 in turn, the activation function is ReLU, so the deep learning neural network used can be expressed as:

$$h_0=U^i$$

$$h_m=\text{ReLU}(W_m \cdot h_{m-1}+b_m).$$

In step 4.2, designing the following output layer for learning:

$$F^i=\Psi(W_M \cdot h_M+b_M)$$

wherein, $F^i=[\hat{P}_{t_j:t_{j+w}}{}^i, \hat{Q}_{t_j:t_{j+w}}{}^i, \hat{S}_{t_j:t_{j+w}}{}^i]$ refers to a load forecast of equipment i, $h_M$ refers to the output of the last hidden layer of the network, $W_M$ and $b_M$ refers to the weight and bias of the output layer respectively, $\Psi(\cdot)$ is the activation function.

In this embodiment, Linear is used the activation function $\Psi(\cdot)$, then the output layer of the network can be expressed as:

$$F^i=\text{Linear}(W_M \cdot h_M+b_M)$$

The load forecast of equipment i during the sampling time $t_0$ to $t_n$ can be expressed as:

$$F^i=[\hat{P}_{1:6739200}{}^i, \hat{Q}_{1:6739200}{}^i, \hat{S}_{1:6739200}{}^i].$$

In step 4.3, the following loss function is designed to train the constructed deep learning neural network model:

$$\text{loss}^i=E(F^i, L_{train}{}^i)$$

wherein, E is a prediction deviation measurement function.

In this embodiment, Mean square error (MSE) is selected as the prediction deviation measurement function, then the loss function used for model training can be further expressed as:

$$\text{loss}^i=MSE(\hat{P}_{1:6739200}{}^i, \hat{P}_{1:6739200}{}^i)$$

The neural network model is trained by iteratively optimizing the above training loss function and setting batch_size as 1000, the learning rate as 0.001, and the number of iterations 50.

Furthermore, after the model training is completed, it is applied to load monitoring in other time periods, specifically, the method described in step 2 is used to enhance the active, reactive, and apparent power data of the building for any length of time period w, the trained neural network model is input, and the model output is the equipment's power consumption in the building during this time period.

In this embodiment, collecting the total load active power $P_{6739201:6739800}$, reactive power $Q_{6739201:6739800}$, and apparent power $S_{6739201:6739800}$ of the same building with a length of 599 starting from time 6739201, and using the method described in step 2 to obtain the enhanced total load data $\overline{P}_{6739201:6739800}$, $\overline{Q}_{6739201:6739800}$, and $\overline{S}_{6739201:6739800}$, and obtaining the total load sample $V=[\overline{P}_{6739201:6739800}, \overline{Q}_{6739201:6739800}, \overline{S}_{6739201:6739800}]$. Inputting V to the trained neural network model, the model output the equipment's power consumption in the building during this time period, comprising the active power $\hat{P}^i_{6739201:6739800}$, the reactive power $\hat{Q}_{6739201:6739800}{}^i$, and the apparent power $\hat{S}_{6739201:6739800}{}^i$.

Figure 2:
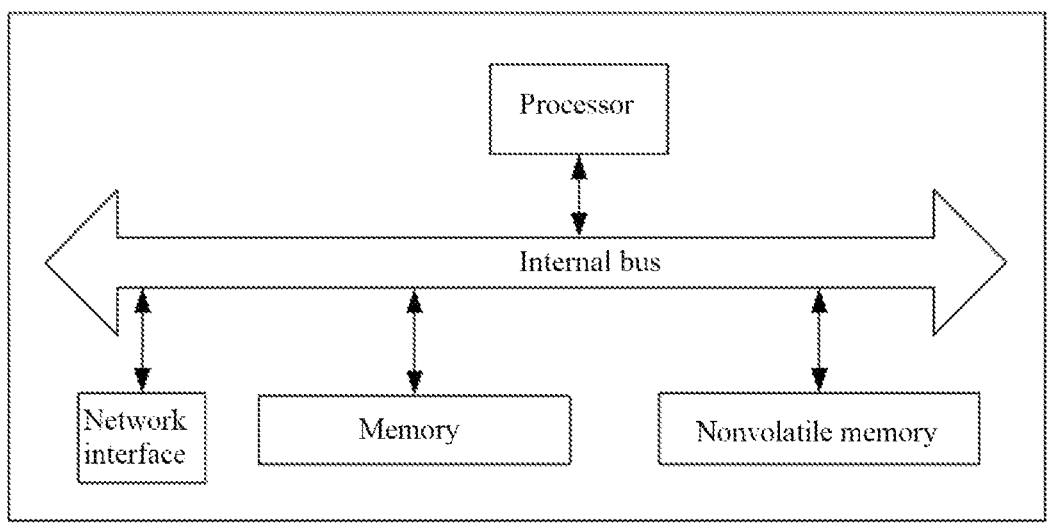
FIG. 2 is a schematic diagram of the structure of a non-intrusive load monitoring device based on temporal attention mechanism of the present invention.

As shown in FIG. 2, a non-intrusive load monitoring device based on temporal attention mechanism provided by the present invention, comprising one or more processors for realizing the non-intrusive load monitoring method based on temporal attention mechanism.

The embodiment of the non-intrusive load monitoring device based on temporal attention mechanism of the present invention can be applied to any device with data processing capability, which can be a device or equipment such as a computer. The device embodiments can be realized by software, hardware or combination of software and hardware. Taking software implementation as an example, as a logical device, it is formed by reading the corresponding computer program instructions in the nonvolatile memory into the memory through the processor of any device with data processing capability. On the hardware level, as shown in FIG. 2, it is a hardware structure diagram of any device with data processing capability where the non-intrusive load monitoring device based on temporal attention mechanism of the present invention. In addition to the processor, memory, network interface and non-volatile memory shown in FIG. 2, any device with data processing capability in the embodiment can also comprise other hardware according to the actual function of any device with data processing capability, which will not be repeated.

The realization process of the function and effect of each unit in the above device is detailed in the realization process of the corresponding steps in the above method, and will not be repeated here.

For the device embodiment, since it basically corresponds to the method embodiment, please refer to the partial description of the method embodiment for relevant points. The device embodiments described above are only schematic, in which the units described as separate units can be or cannot be physically separated, and the units displayed as units can be or cannot be physical units, that is, they can be located in one place, or they can be distributed to multiple network units. Some or all of the modules can be selected according to the actual needs to realize the purpose of the scheme of the invention. Ordinary technicians in the art can understand and implement without paying creative labor.

This embodiment of the present invention also provides a computer readable storage medium on which a program is stored, when the program is executed by a processor, the non-intrusive load monitoring method and device based on temporal attention mechanism of this embodiment is realized.

The computer readable storage medium may be an internal storage unit of any device with data processing capability described in any of the aforementioned embodiments, such as a hard disk or a memory. The computer readable storage medium may be an external storage device, for example, a plug-in hard disk, a smart media card (SMC), a SD card, a flash card, etc. equipped on the device. Furthermore, the computer readable storage medium can also include both an internal storage unit of any device with data processing capability and an external storage device. The computer readable storage medium is used to store the computer program and other programs and data required by any device with data processing capability, and can also be used to temporarily store the data that has been output or will be output.

The above description is only a preferred implementation case of the invention and does not limit the invention in any form. Although the implementation process of the invention has been described in detail above, for those who are familiar with the art, they can still modify the technical solutions recorded in the above examples, or replace some of the technical features equally. Any modification and equivalent replacement made within the spirit and principle of the invention shall be included in the protection scope of the invention.

The invention claimed is:

1. A non-intrusive load monitoring method based on temporal attention mechanism, comprising the following steps:
   step 1: obtaining a total load data, an equipment load data, and corresponding sampling time of a building during a certain period of time;
   step 2: integrating the total load data and the equipment load data with the corresponding sampling time to obtain an enhanced total load data and an enhanced equipment load data;
   step 3: using a sliding window method to segment the enhanced total load data and the enhanced equipment load data, and constructing a deep learning training dataset;
   step 4: constructing a neural network model based on a deep learning training framework and training the model using the training dataset obtained in step 3;
   wherein, the step 1 is specially as follows:
   obtaining a load power consumption of the building during a certain period of time, sampling time $T=[t_0, t_1, \ldots, t_n]$, and the total load data comprises a total load active power $P_{t_0:t_n}$, a reactive power $Q_{t_0:t_n}$, and an apparent power $S_{t_0:t_n}$, the equipment load data comprises an active power $P_{t_0:t_n}^i$, a reactive power $Q_{t_0:t_n}^i$, and an apparent power $S_{t_0:t_n}^i$ of each equipment during the above sampling time, where i is the equipment number;
   wherein, the step 2 is specially as follows:
   firstly, converting the sampling time $T=[t_0, t_1, \ldots, t_n]$ to the corresponding number of weeks, that is $T_d=[d_0, d_1, \ldots, d_n]$, wherein, $d_n$ represents the number of weeks the sampling time $t_n$ belongs to;
   then, based on the attention mechanism, the total load data and the equipment load data are fused separately with $T_d$, as shown below:

$$\overline{F}=\text{attn}(F,T_d)$$

among them, F can represent the total load active power $P_{t_0:t_n}$, the reactive power $Q_{t_0:t_n}$ and the apparent power $S_{t_0:t_n}$, as well as the equipment load active power $P_{t_0:t_n}^i$, the reactive power $Q_{t_0:t_n}^i$ and the apparent power $S_{t_0:t_n}^i$;

$\overline{F}$ represents the load data after fusion and enhancement with time information $T_d$; obtaining the enhanced total load data $\overline{P}_{t_0:t_n}$, $\overline{Q}_{t_0:t_n}$ and $\overline{S}_{t_0:t_n}$, and the enhanced equipment load data $\overline{P}_{t_0:t_n}^i$, $\overline{Q}_{t_0:t_n}^i$ and $\overline{S}_{t_0:t_n}^i$; attn( ) represents the attention mechanism function; and
   wherein, after the model training is completed, it is applied to load monitoring in other time periods, specifically, the method described in step 2 is used to enhance the active, reactive, and apparent power data of the building for any length of time period w, the trained neural network model is input, and the model output is the equipment's power consumption in the building during this time period.

2. The non-intrusive load monitoring method based on temporal attention mechanism according to claim 1, wherein, the attention mechanism is implemented using a neural network, i.e., $$\overline{F}=F+\varphi(T_d)\cdot T_d$$

wherein, $\varphi$ represents the neural network and $\cdot$ represents matrix product.

3. The non-intrusive load monitoring method based on temporal attention mechanism according to claim 2, wherein, the step 4 is specially as follows:
   in step 4.1, inputting $U^i$ to the following deep learning neural networks:

$$h_0=U^i$$

$$h_m=\Phi(W_m\cdot h_{m-1}+b_m)$$

wherein, $h_0$ is neural network input, $h_m$, $W_m$, and $b_m$ are respectively the output, weight and bias of the mth hidden layer of the neural network model, and $\Phi(\cdot)$ is the activation function;
   in step 4.2, designing the following output layer for learning:

$$F^i=\Psi(W_M h_M+b_M)$$

wherein, $F^i=[\hat{P}_{t_j:t_{j+w}}^i, \hat{Q}_{t_j:t_{j+w}}^i, \hat{S}_{t_j:t_{j+w}}^i]$ refers to a load forecast of equipment i, $h_M$ refers to the output of the last hidden layer of the network, $W_M$ and $b_M$ refers to the weight and bias of the output layer respectively, $\Psi(\cdot)$ is the activation function;
   in step 4.3, the following loss function is designed to train the constructed deep learning neural network model:

$$\text{loss}^i=E(F^i, L_{train}^i)$$

wherein, E is a prediction deviation measurement function.

4. The non-intrusive load monitoring method based on temporal attention mechanism according to claim 1, wherein, the step 3 is specially as follows:
   firstly, using the enhanced total load data and the enhanced equipment load data to construct total load samples $M=[\overline{P}_{t_0:t_n}, \overline{Q}_{t_0:t_n}, \overline{S}_{t_0:t_n}]$, as well as individual load samples $L^i=[\overline{P}_{t_0:t_n}^i, \overline{Q}_{t_0:t_n}^i, \overline{S}_{t_0:t_n}^i]$;
   then, using the sliding window with a width of w and a step size of 1 to divide M and $l_i$, and constructing the training data, wherein $$M_{train}=\{[\overline{P}_{t_j:t_{j+w}}, \overline{Q}_{t_j:t_{j+w}}, \overline{S}_{t_j:t_{j+w}}]|j=0, \ldots, n-w\}$$

$$L_{train}^i=\{[\overline{P}_{t_j:t_{j+w}}^i, \overline{Q}_{t_j:t_{j+w}}^i, \overline{S}_{t_j:t_{j+w}}^i]|j=0, \ldots, n-w\}$$

5. A non-intrusive load monitoring device based on temporal attention mechanism, comprising one or more processors, for implementing the non-intrusive load monitoring method based on temporal attention mechanism according to claim 1.

6. A non-transitory computer readable storage medium on which a program is stored, when the program is executed by a processor, the non-intrusive load monitoring method based on temporal attention mechanism according to claim 1.

* * * * *